United States Patent Office 3,039,989
Patented June 19, 1962

3,039,989
CURABLE POLYETHYLENE CONTAINING BASIC LEAD CARBONATE AND A PEROXIDE CURING AGENT
Warren O. Eastman, Derby, Conn., assignor to General Electric Company, a corporation of New York
No Drawing. Filed June 18, 1959, Ser. No. 821,125
6 Claims. (Cl. 260—41)

This invention relates to polyethylene-containing compositions which may be cross-linked by the application of heat. More particularly, the invention relates to polyethylene-containing compositions containing di-α-cumyl peroxide and basic lead carbonate.

For many years, polyethylene was a thermoplastic polymer somewhat limited in its uses due to its relatively low melting point. In recent years, however, it has been found that polyethylene can be made thermosetting, i.e., vulcanizable or cross-linkable, either by irradiation with high potential electrons or by the use of tertiary peroxides, particularly di-α-cumyl peroxide. Since cross-linked polyethylene can withstand much higher temperatures than the thermoplastic type, the result has been that fields, such as electrical insulation, wherein ability to withstand high temperatures is important have been opened up to polyethylene. Fillers, many of them reinforcing, have been developed for cross-linked polyethylene and these have additionally broadened its field of application. Gilbert and Precopio Patent No. 2,888,424, assigned to the same assignee as the present application, discloses the use of silica, carbon black, alumina, and calcium silicate as fillers which may be used advantageously in cross-linked polyethylene.

An important filler for cross-linked polyethylene is carbon black. However, where the polyethylene is to be used as electrical insulation, the proportion of carbon black added is limited due to the reduction in desirable insulating properties brought about by this conducting material. While other fillers produce a cross-linked polyethylene which is suitable for many purposes, electrical insulation requires characteristics such as long life, toughness, stability at high temperatures, extrudability, etc., and there has been need for a considerable improvement in presently known filled polyethylene-containing insulating materials if these requirements are to be met satisfactorily.

One object of the present invention is to provide a filled cross-linked polyethylene having good electrical insulating properties.

Another object of the invention is to provide a filled cross-linked polyethylene composition which can be extruded onto conductors by conventional extrusion techniques.

Another object of the invention is to provide a filled cross-linked polyethylene composition which will have sufficient form stability after being extruded to undergo a cure in open steam.

Other objects of the invention will be apparent from a perusal of the following specification and claims. Briefly stated, the invention is directed to a curable composition comprising polyethylene or blends of polyethylene and other polymers, a tertiary peroxide, and basic lead carbonate filler.

While the invention is directed particularly to cross-linked polyethylene itself, it is to be understood that other polymers may be present in the composition. Accordingly, the absence of a prolonged discussion of other polymers which may be blended with polyethylene should not be construed to limit the invention just to polyethylene.

In general, the invention is carried out by intimately mixing basic lead carbonate, a complex compound of the formula $2PbCO_3 \cdot Pb(OH)_2$, polyethylene, and a tertiary peroxide and subsequently curing this composition. The admixture of these components can be effected by any of the conventional methods, for example, working on a roller mill, a Banbury mixer, etc. Preferably, the polyethylene is added first, then the basic lead carbonate, and the peroxide last. The mixing of these components may be accomplished over a wide range of temperatures depending on the particular peroxide employed. Generally, the mixing is effected at elevated temperatures such as within a range of 100° C. to 135° C. In general, the mixing is carried out at a temperature just below the activation temperature of the peroxide employed.

After the mixture has become homogeneous, the composition may be molded, extruded, calendered, etc., by conventional methods. The temperature at which the shaping operation is effected can be varied widely depending upon whether it is desired that shaping and curing be accomplished in one operation. Curing of the composition can be accomplished at ordinary pressures or at super-atmospheric pressure, such as from 10–1,000 lbs. per square inch or more in the mold or press. Where the material is extruded as insulation on a conductor, it is customary to effect cure by passage of the wire through a chamber containing steam under pressure. If surface cure alone is desired, a composition from which the peroxide has been omitted may be extruded into a solution containing the peroxide, and thereupon heat-cured to produce a case hardened polymer.

Di-α-cumyl peroxide is the preferred peroxide of this invention. The optimum amount of the peroxide to be incorporated into the composition depends upon the time and temperature of the heat treatment, and the degree of cure desired in the polymer. Generally, if the peroxide composition is cured between 150° C. and 200° C., from 0.1–20% of the peroxide based on the weight of the polyethylene may be used, but preferably 0.5–10%. The upper limits of peroxide produce a cured product of greatly reduced thermoplasticity.

The polyethylene referred to herein is a polymeric material formed by the polymerization of ethylene. It is described in Patent No. 2,153,553—Fawcett et al., and in "Modern Plastics Encyclopedia," New York 1949, pages 268–271. Specific examples of commercially available polyethylene are the polyethylene sold by E. I. Du Pont de Nemours & Co., Inc., Wilmington, Delaware, examples of which are "Alathons 1, 3, 10, 12, 14, etc.," those sold by the Bakelite Company, such as "DE-2400, DYNH, etc.," and the Phillips Petroleum Company polymers, such as "Marlex 20, 50, etc." Other polyethylenes of various molecular weights are described by Lawton et al. in "Industrial and Engineering Chemistry" 46, pages 1702–1709 (1954).

Basic lead carbonate is readily available in finely divided form, a typical material consisting of a very fine powder of an average particle diameter of about 0.5 micron with a range of 0.1 to 2.0 microns. This filler is available from the John R. MacGregor Lead Company, Chicago, Illinois, under the trade designation "Scotch Laddie #15 Basic Lead Carbonate." The specific gravity of basic lead carbonate is about 6.5 which compares to a specific gravity of about 2 for most conventional filler materials. The excellent form stability imparted by the addition of basic lead carbonate may be in part explained by this high specific gravity.

Among the tertiary peroxides which can be used to cure polyethylene-containing basic lead carbonate filler are those having the formula

R—O—O—R′ where R and R' (which may or may not be similar) are radicals selected from the group consisting of

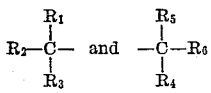

where $R_1$, $R_2$, $R_3$, $R_4$ comprise alkyl radicals such as methyl, ethyl, propyl, butyl, pentyl, hexyl, heptyl, octyl, nonyl, decyl, undecyl, octadecyl, etc. and isomers thereof; cycloalkyl radicals such as cyclopropyl, cyclobutyl, cyclopentyl, cyclohexyl, cycloheptyl, cyclooctyl, etc.; alkylcycloalkyl radicals such as methylcyclobutyl, ethylcyclopentyl, tert-butyl-methylcyclohexyl, isopropylcyclohexyl, etc.; cycloalkyl-alkyl radicals such as cyclopropylmethyl, cyclopentylethyl, cyclohexylpropyl, etc.; aryl radicals such as phenyl, biphenyl, naphthyl, anthracyl, tolyl, xylyl, ethylphenyl, tert-butylphenyl, propylbiphenyl, ethylnaphthyl, tert-butylnaphthyl, propylnaphthyl, etc.; aralkyl radicals such as benzyl, phenylethyl, naphthylpropyl, etc. The unit

is a radical wherein the tertiary carbon attached to the peroxide oxygen is contained within a hydrocarbon cyclic radical structure such as cyclopropyl, cyclobutyl, cyclopentyl, cyclohexyl, cycloheptyl, etc., an example of which is di-phenylcyclohexyl peroxide,

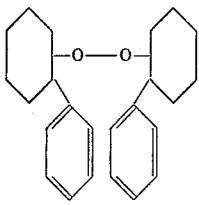

Mixtures of these peroxides may also be used.

In addition, these peroxides may contain inorganic groups, such as halogens, nitro groups, etc., for example, chlorophenyl, bromophenyl, nitrophenyl, etc.

The peroxides disclosed herein can be prepared by any of the methods known to the art. For example, di-α-cumyl peroxide,

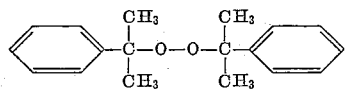

(sold by Hercules Powder Co. of Wilmington, Delaware) can be prepared by the method described by Kharasch et al. in the "Journal of Organic Chemistry" 15, pages 756–762 (1950), tert-butyl-α-cumyl peroxide,

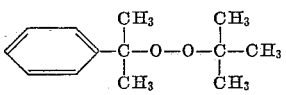

by the method of Kharasch et al. in the "Journal of Organic Chemistry" 15, pages 775–781 (1950), etc.

For ease of handling, di-α-cumyl peroxide is normally mixed with another substance. A standard formulation consists of 40 parts by weight of di-α-cumyl peroxide and 60 parts by weight of calcium carbonate.

Compositions consisting of 30%–65% by weight of polyethylene, 4% tertiary peroxide based upon the weight of polyethylene, and the balance preponderantly of basic lead carbonate are satisfactory in the practice of this invention. The term "preponderantly" is used in describing the proportion of basic lead carbonate since other filler materials may also be present. A preferred proportion is about 50% by weight polyethylene, 2% by weight tertiary peroxide, and 48% by weight basic lead carbonate. Such a mixture possessed a tensile strength of 3,000 lbs. per square inch, was stretchable to four and one-half times its initial length, and possessed excellent electrical insulating properties.

My application Serial No. 105,868, filed April 27, 1961, assigned to the same assignee as the present application, disclosed the addition of 1,3-dihydro-2,2,4-trimethylquinoline as an antioxidant for cross-linked polyethylene. This antioxidant may advantageously be used in the present invention in the proportions 0.25% to 0.375% by weight set forth in my co-pending application.

The following examples are given by way of illustrating the present invention and not by way of limitation. All parts and percentages are by weight.

*Example 1.*—Polyethylene (100 parts) and basic lead carbonate (100 parts) were mixed on a rubber mill at 120° C. until a homogeneous sheet was obtained. Thereupon, di-α-cumyl peroxide (10 parts of a 40% di-α-cumyl peroxide in calcium carbonate mixture) and a polymer of 1,3-dihydro-2,2,4-trimethylquinoline (0.25 part) were milled into the sheet. This product was pressed into a 50 mil sheet by heating in a press for 15 minutes at 166° C. under 600 p.s.i. to produce a sheet having a room temperature tensile strength of 3,000 lbs. per square inch and a room temperature elongation of 450%. The power factor at room temperature was 4.4% and the dielectric constant 3.13.

*Example 2.*—Polyethylene (65 parts) and basic lead carbonate (32.5 parts) were mixed and cured in the manner of Example 1 using the same amount of di-α-cumyl peroxide (4 parts). The pressed sheet of this material had a room temperature tensile strength of 3,500 lbs. per square inch and a room temperature elongation of 500%. The insulation strength of this material was approximately the same as that of unfilled polyethylene.

*Example 3.*—Polyethylene (100 parts) was mixed with basic lead carbonate (100 parts) in the manner described in above Example 1 and di-α-cumyl peroxide (4 parts) was added as a curing agent. This composition was extruded onto #20 AWG stranded wire in a thickness of 10 mils. Cure was effected by passage through a steam chamber where the wire was subjected for 48 seconds to steam at 200 lbs. per square inch gauge pressure. The resulting wire was entirely satisfactory from a product standpoint.

*Example 4.*—Polyethylene (100 parts) was mixed with basic lead carbonate (230 parts) in the manner described in Example 1 and di-α-cumyl peroxide (10 parts) was added as a curing agent. A sample cured for one minute with steam at a pressure of 250 lbs. per square inch had a tensile strength of 2,325 lbs. per square inch and gave an elongation of 450%.

The uncured polymeric compositions which, according to the present invention, may be blended with the basic lead carbonate-polyethylene compositions and cured to polymers of enhanced properties comprise organopolysiloxanes, such as those disclosed and claimed in Agens Patent No. 2,448,756; Sprung Patents Nos. 2,448,556 and 2,484,595; Krieble et al. Patent No. 2,457,688; Hyde Patent No. 2,490,357; Marsden Patent No. 2,521,528; Warrick Patent No. 2,541,137; etc.; copolymers of butadiene and styrene (where the butadiene, e.g., butadiene-1,3, may comprise from 20 to 80% of the total weight of the butadiene and styrene), an example of which is S.B.R. rubber; copolymers of butadiene and acrylonitrile (where the butadiene may comprise from about 55 to 80% of the total weight of the butadiene and the acrylonitrile), an example of which is Hycar OR rubber; polymeric chloroprene or 2-chlorobutadiene, an example of which is neoprene; polymers of monohydric alcohol esters of acrylic acid, e.g., polymeric methyl acrylate, polymeric butyl acrylate, such polymeric materials ranging from tough, pliable rubber-like substances in the case of the polymeric methyl acrylate to softer and more elastic products in the case of the polymeric, longer chain alkyl acrylates (examples of polymeric alkyl acrylates which may be employed are more particularly described in Semegen Patents Nos. 2,411,899; 2,412,475 and 2,412,476) and are sold under the name of, for instance, Polyacrylic Ester EV; polystyrene (either liquid or solid); chlorosulfonated polyethylenes, such as Hypolon S–2 (Du Pont) etc., and natural rubbers, e.g., smoke sheet and natural crepe, etc. Mixtures of these above-described polymeric compositions may also be incorporated into the basic lead carbonate-polyethylene compositions.

While the invention has been described with reference to certain specific embodiments thereof, it is obvious that there may be many variations which fall within the true spirit of the invention. Accordingly, the invention should be limited in scope only as may be necessitated by the scope of the appended claims.

What I claim as new and desire to secure by Letters Patent of the United States is:

1. A curable composition comprising 30% to 65% by weight of polyethylene, a peroxide in which each of the peroxide is linked directly to a tertiary carbon atom whose remaining valences are attached to radicals selected from the group consisting of alkyl, cycloalkyl, alkylcycloalkyl, aryl, and aralkyl to the extent of about 4% by weight of the polyethylene present, and the balance consisting of basic lead carbonate.

2. The cured product of claim 1.
3. The curable composition comprising 30% to 65% by weight of polyethylene, di-α-cumyl peroxide to the extent of about 4% by weight of the polyethylene present, and the balance consisting of basic lead carbonate of a particle size of about one-half micron.
4. The cured product of claim 3.
5. A curable composition comprising 30% to 65% by weight of polyethylene, di-α-cumyl peroxide to the extent of about 4% by weight of the polyethylene present, a polymer of 1,3-dihydro-2,2,4-trimethylquinoline to the extent of 0.25% to 0.375% by weight of the polyethylene present, and the balance consisting of finely divided basic lead carbonate.
6. The cured product of claim 5.

References Cited in the file of this patent

UNITED STATES PATENTS

| | | |
|---|---|---|
| 2,639,998 | Pavlic | May 26, 1953 |
| 2,852,488 | Clark et al. | Sept. 16, 1958 |
| 2,876,133 | Iler et al. | Mar. 3, 1959 |
| 2,888,424 | Precopio et al. | May 26, 1959 |
| 2,928,801 | Safford et al. | Mar. 15, 1960 |